United States Patent
Bolinth et al.

(10) Patent No.: US 7,580,383 B2
(45) Date of Patent: *Aug. 25, 2009

(54) ADAPTIVE MODULATION AND OTHER EXTENSIONS OF THE PHYSICAL LAYER IN MULTIPLE ACCESS SYSTEMS

(75) Inventors: Edgar Bolinth, Mönchengladbach (DE); Ralf Kern, Bocholt (DE)

(73) Assignee: Gigaset Communications GmbH, Munich (DE)

( * ) Notice: Subject to any disclaimer, the term of this patent is extended or adjusted under 35 U.S.C. 154(b) by 552 days.

This patent is subject to a terminal disclaimer.

(21) Appl. No.: 10/510,520

(22) PCT Filed: Mar. 14, 2003

(86) PCT No.: PCT/DE03/00830

§ 371 (c)(1),
(2), (4) Date: Sep. 28, 2004

(87) PCT Pub. No.: WO03/084138

PCT Pub. Date: Oct. 9, 2003

(65) Prior Publication Data

US 2005/0141448 A1 Jun. 30, 2005

(30) Foreign Application Priority Data

Mar. 28, 2002 (DE) ................................. 102 14 117

(51) Int. Cl.
*H04W 4/00* (2009.01)
*H04L 12/413* (2006.01)
*H04L 12/43* (2006.01)

(52) U.S. Cl. ........................ 370/328; 370/447; 370/461
(58) Field of Classification Search ......... 370/328–344, 370/203–210, 445–462
See application file for complete search history.

(56) References Cited

U.S. PATENT DOCUMENTS 5,521,906 A * 5/1996 Grube et al. ................. 370/252

(Continued)

FOREIGN PATENT DOCUMENTS

DE 100 46 655 A1 6/2001

(Continued)

OTHER PUBLICATIONS

Kim, Dongwoo; "Forward Link Power Allocation for IS-95 Based CDMA Mobile Systems", R&D Center, Shinsegi Telecomm Inc., IEEE 1999, 0-7803-5284, pp. 1126-1130.*

(Continued)

*Primary Examiner*—Tri H Phan
(74) *Attorney, Agent, or Firm*—Baker Botts L.L.P.

(57) ABSTRACT

The present invention seeks to improve data exchange in a communications system that is especially standardized according to IEEE 802.11a. For this purpose, when the transmission medium, preferably an IEEE 802.11 system with a distributed coordination function (DCF) is accessed in a decentralized manner, pilot signals are transmitted from the transmitter to the recipients using a number of transmission modes and then an allocation table regarding the transmission modes is calculated by the recipient on the basis of the pilot symbols received. The recipient transmits the allocation table to the transmitter so that the subsequent data exchange can proceed on the basis of the allocation table. In the case of centralized access, preferably an IEEE 802.11 system with a point coordination function (PCF), data exchange is improved in that the subsequent data are adaptively modulated already when the allocation table is transmitted.

18 Claims, 8 Drawing Sheets

U.S. PATENT DOCUMENTS

| | | |
|---|---|---|
| 6,359,934 B1 | 3/2002 | Yoshida |
| 6,452,917 B1 * | 9/2002 | Leung ........................ 370/342 |
| 2002/0172186 A1 * | 11/2002 | Larsson ...................... 370/349 |

FOREIGN PATENT DOCUMENTS

| | | |
|---|---|---|
| EP | 1 187 413 A1 | 3/2002 |
| WO | WO 02/082751 A2 * | 10/2002 |

OTHER PUBLICATIONS

Information Technology Telecommunications and Information Exchange between Systems Local and Metropolitan Area Networks Specific Requirements, Part 11, Wireless LAN Medium Access Control (MAC) and Physical Layer (PHY) Specifications, Chapter 9, 1999, pp. 70-79.

Drabu Yasir: A survey of QoS Techniques in 802.11. Jan. 1999, pp. 1-11.

AT&T et al.: IEEE 802.11 QoS MAC Enhancements Joint Proposal Passage, IEEE 802.11 May 2000, pp. 1-50.

Jim Mollenauer et al.: Polling based PCF For Strom QoS Guarantees, IEEE 802.11-00/061, May 2000, pp. 1-22.

Barreto A.N., Furrer S.: Adaptive bit loading for wireless OFDM systems, Personal, Indoor and Mobile Radio Communications, 2001, $12^{th}$ IEEE International Symposium, Sep./Oct. 2001, San Diego vol. 2.

* cited by examiner

ADAPTIVE MODULATION AND OTHER EXTENSIONS OF THE PHYSICAL LAYER IN MULTIPLE ACCESS SYSTEMS

BACKGROUND OF THE INVENTION

The present invention relates to a method of transmitting data signals in a communication system with access to the transmission medium organized on a central or distributed basis using a number of transmission modes. In particular the present invention relates to a signaling scheme for adaptive modulation in a CSMA/CA (Carrier Sense Multiple Access Collision Avoidance) IP-based access system.

A serious problem in mobile radio transmission is the frequency selectivity of the mobile radio channels. The frequency selectivity, generated by multipath propagation with large delay time differences, causes heavily linear distortions of the receive signal, which makes it necessary to use expensive equalizers or to use Viterbi detection. A suitable way of combating the disadvantages of frequency selective channels is what is known as Adaptive Modulation (AM), which is described in greater detail below.

Adaptive Modulation is used in OFDM (Orthogonal Frequency Division Multiplexing) systems to reduce the disadvantages of frequency selective fading channels. In such cases, the data is transmitted over individual subcarriers.

A brief description of the principle of adaptive modulation will be given below. A transmitter transmits data to a receiver over the radio channel. In the transmitter, the data to be transmitted is initially coded and interleaved by a coder and an interleaver. Subsequently, the data is modulated with a different modulation loading, depending on the channel attribute. Suitable modulation alphabets/methods for this are, for example, the known amplitude/phase shift keying methods BPSK, QPSK, 16 QAM, 64 QAM, etc. with the relevant modulation loadings 1, 2, 4 and 6. With a high signal-to-noise ratio the relevant subcarrier is to be modulated with a high number of bits whereas with a low signal-to-noise ratio a low number of bits is sufficient. The signal-to-noise ratio normally will be estimated in the receiver and converted for the individual subcarriers in a bit loading table. A bit loading table of this type can, for example, contain information about the signal-to-noise ratio or alternatively the required modulation loading for each individual subcarrier. This bit loading table is transferred to the transmitter so that the latter can activate a demultiplexer DEMUX and a multiplexer MUX, accordingly, for adaptive modulation.

The demultiplexer DEMUX directs the bit stream received by the interleaver to the modulator $MOD_1, \ldots MOD_{n-1}$, $MOD_n$, assigned a specific modulation loading. In this case, modulator $MOD_1$ can, for example be a BPSK modulator and modulator $MOD_n$ a 64 QAM modulator. Depending on the pointers received by the relevant modulation, the multiplexer MUX which is also controlled via the bit loading table is subjected to an inverse Fast-Fourier Transformation IFFT. The pointers to the relevant subcarriers are transformed there for transmission and subsequently modulated up to the carrier frequency.

In the receiver this process is essentially reversed. Initially, the data is obtained as pointers from the individual subcarriers using a Fast-Fourier transformation. A subsequent demultiplexer DEMUX allocates the data in accordance with the bit loading table to the suitable demodulator. The bit stream obtained from the demodulators $DEMOD_1 \ldots, DEMOD_{n-1}$, $DEMOD_n$ is fed via a multiplexer MUX to a deinterleaver and channel coder.

As already mentioned, the desired bit loading table for adaptive modulation is to be transmitted from the transmitter to the receiver. An important point here is that the bit loading tables are typically calculated in the receiver on the basis of RSSI (Radio Signal Strength Indication) and SNR (Signal to Noise/Interference Ratio) and must be transferred to the transmitter. For a TDD (Time Division Duplex) scheme a WSS (White Sense Stationary) channel is usually assumed for a period in which the bit loading table is valid.

Standard IEEE 802.11a specifies the Medium Access Control (MAC) and physical characteristics for radio LAN systems. A Medium Access Control unit in accordance with this Standard is designed to support the components of a physical layer depending on the availability of the spectrum as regards their permission to access the transmission medium.

Basically, there are two coordination options for access available: the central and the local access function. With the central access function (Point Coordination Function, PCF) the coordination function logic is only active in a station or in a terminal of a group of terminals (Basic Service Set, BSS), respectively, for as long as the network is in operation. By contrast, with the Distributed Coordination Function (DCF) the same coordination function logic is active in each station or each terminal of the terminal group, respectively, for as long as the network is in operation.

Figure 1:
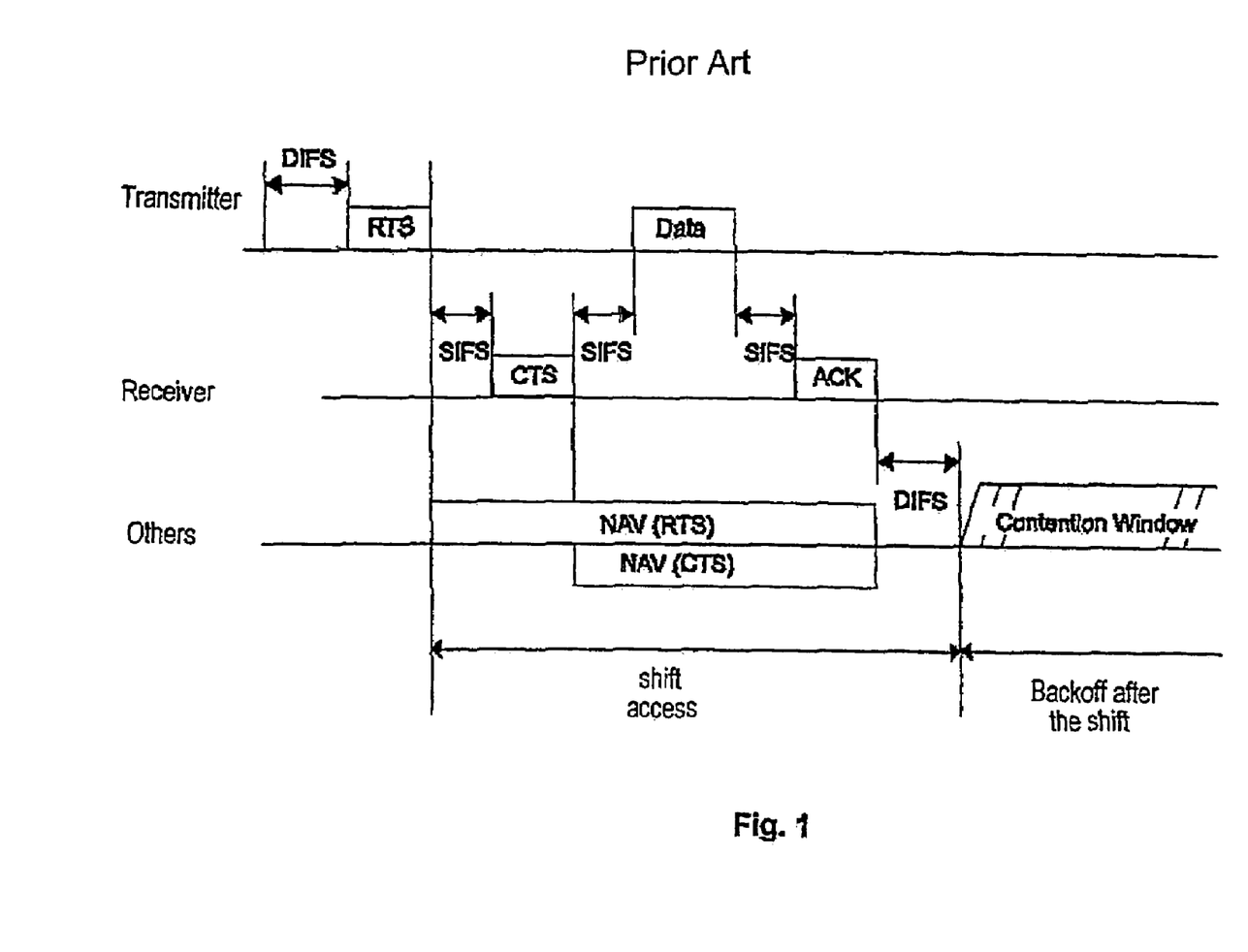
FIG. 1 shows a signaling scheme of a DCF (Distributed Coordination Function) data exchange in accordance with Standard IEEE 802.11.

FIG. 1 shows the data frame structure for this exchange of data in a Distributed Coordination Function (DCF) according to Standard IEEE 802.11. The reader is referred to this Standard as regards the abbreviations and terms used in this document. According to FIG. 1, the following units participate in communication: a transmitter, a receiver and other units. After a wait time, known as the DCF Interframe Space (DIFS), the transmitter transmits an RTS (Ready to Send) signal to the network.

After a short wait time (Short Interframe Space, SIFS), the receiver sends the CTS(Clear to Send) signal, indicating that it is ready to receive. After another short wait time SIFS the transmitter sends to the network the data to be transmitted. After the transmission and a wait time SIFS, the receiver confirms the receipt of the data with the acknowledge message ACK. The wait times SIFS and DIFS in this case are 16 µs and 34 µs, respectively.

For other communication users the NAV (Network Allocation Vector) is set at the initiative of the RTS or CTS signal, specifying for how long a transmission cannot be executed on the wireless medium by the relevant station.

Access to the radio system is only possible again once the wait time DIFS has elapsed after receipt of the acknowledgement ACK of the receiver. In the subsequent window, known as the contention window, to avoid collisions, there is a delay by a random backoff time.

Figure 2:
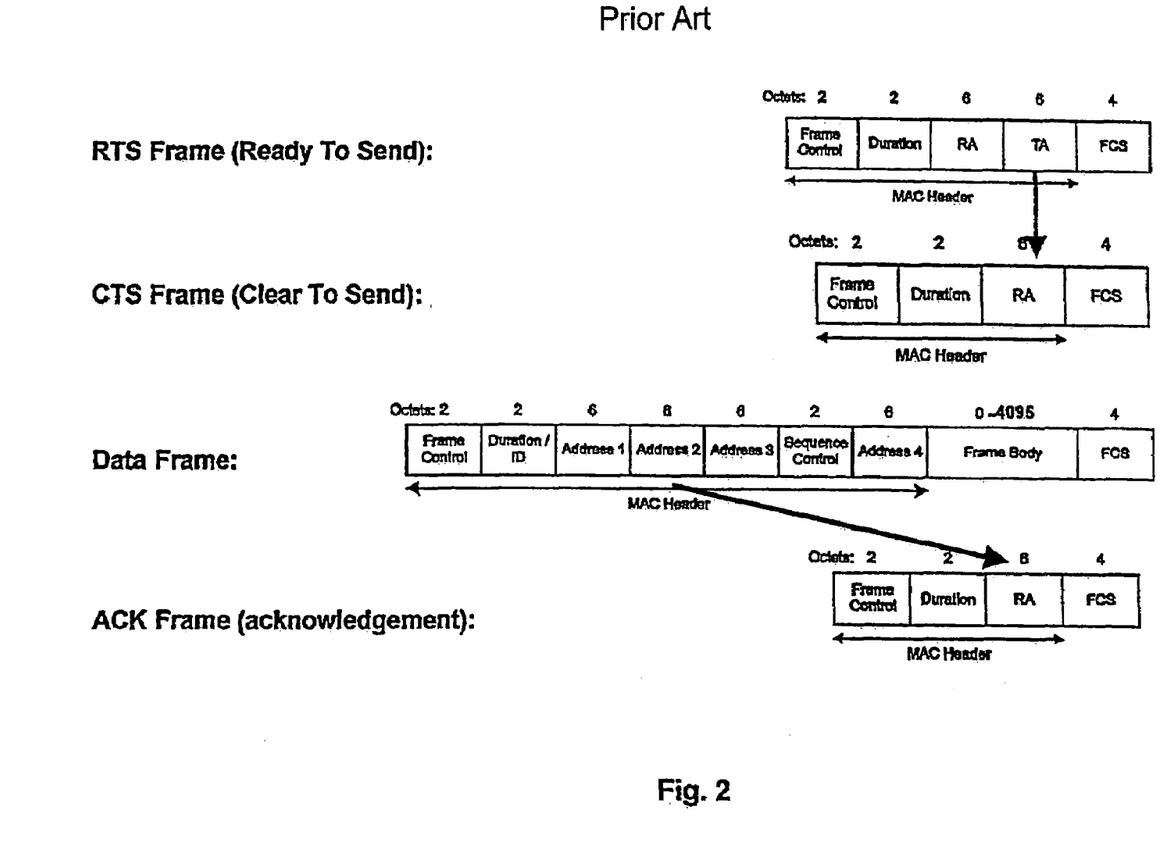
FIG. 2 shows the structure of the data packet for data exchange in accordance with FIG. 1.

FIG. 2 shows the frame or data packet formats of the frames shown in FIG. 1. Of particular importance in this context is the interplay between transmitter and receiver and, thereby, the relevant addressing. Thus, the RTS frame accommodates the Transmitter Address (TA) encoded with six octets. The Receiver Address is also coded with six octets in the CTS frame. The data frame which is sent by the transmitter contains the destination address in address block "Address 2." The ACK frame returned by the receiver for acknowledgement again contains the RA (Receiver Address) so that the transmitter can uniquely assign the acknowledgement.

An object of the present invention is to increase the channel capacity in a communication system.

SUMMARY OF THE INVENTION

To achieve this, the present invention makes provision for a method for transmitting data signals with access organized on a distributed basis to the transmission medium using a number of transmission modes, by sending at least one pilot signal from the transmitter to the receiver, calculating an assignment table with regard to the transmission modes on the basis of the pilot signals received by the receiver, transmission of the assignment table from the receiver to the transmitter and transmission of the data signals using the transmission modes in accordance with the assignment table from the transmitter to the receiver or from the receiver to the transmitter.

In addition, a method is provided for transmission of data signals in a communication system with centrally organized access to the transmission medium using a number of transmission modes, by transmission of at least one pilot signal from the transmitter to the receiver, calculation of an assignment table as regards the transmission mode on the basis of the pilot signals received by the receiver, transmission of the assignment table from the receiver to the transmitter and transmission of the data signals using the transmission modes transferred in the assignment table in accordance with the assignment table from the receiver to the transmitter.

Thus, adaptive nodulation also can be applied in multiple access systems; for example, to the CSMA (Carrier Sense Multiple Access) system on the basis of the bit loading signaling scheme specified by the present invention. For adaptive modulation, however, it is absolutely vital for the desired bit loading tables to be transferred correctly from the receiver to the transmitter. If this is not the case, serious faults can occur. Use of the bit loading signaling scheme above all makes it possible to transmit adaptively-modulated data packets which, because of the adaptive modulation, are less susceptible to packet errors.

Advantageously, the proposed solution can be applied to a CSMA/CA (Collision Avoidance) scheme with distributed access in which the RTS (Ready to Send) signals, CTS (Clear to Send) signals and NAV (Network Allocation Vector) are used for reservation of the common medium for data transmission and, where necessary, the ACK (Acknowledge) message is also used to acknowledge data receipt. As such, at the basic level adaptive modulation can be employed for an OFDM (Orthogonal Frequency Division Multiplexing) system or an MC/CDMA-(Multi Carrier Code Division Multiple Access) system which are based on CSMA/CA access.

As already indicated, the method in accordance with the present invention can be used very advantageously for IEEE 802.11-standard systems. In such systems, pilots can be sent for calculating bit loading tables in the RTS signal for distributed access. Furthermore, it is worthwhile for the transmitter to ask the receiver in the RTS signal whether it is capable of adaptive modulation and, where necessary, of executing additional functions, known as the PHY extensions, within the framework of the physical layer.

In a similar way, it is advantageous for the receiver to ask the transmitter in the CTS signal about the ability to execute adaptive modulation and, where necessary, further PHY extensions. At the same time, the receiver can send the assignment tables or bit loading tables calculated on the basis of the pilots, respectively, in the CTS signal to the transmitter.

For bidirectional data traffic via of adaptive modulation of two communication terminals it should be stressed, in particular, that each terminal can be both a transmitter and a receiver. Within the context of the IEEE 802.11a Standard it appears sensible to transmit the bit loading tables using three OFDM data symbols which each consist of 24 data bits.

A confirmation of the use of a specific PHY extension can be given in the CTS signal of the receiver.

Data should be transmitted with a fixed modulation scheme both in the case of central access and in the case of distributed access, provided there is no current bit loading table present at the transmitter or receiver.

The timing of both systems, the system with central access and the system with distributed access, can be interleaved, so that the specific components in each case can be used in parallel.

Additional features and advantages of the present invention are described in, and will be apparent from, the following Detailed Description of the Invention and the Figures.

DETAILED DESCRIPTION OF THE INVENTION

Figure 3:
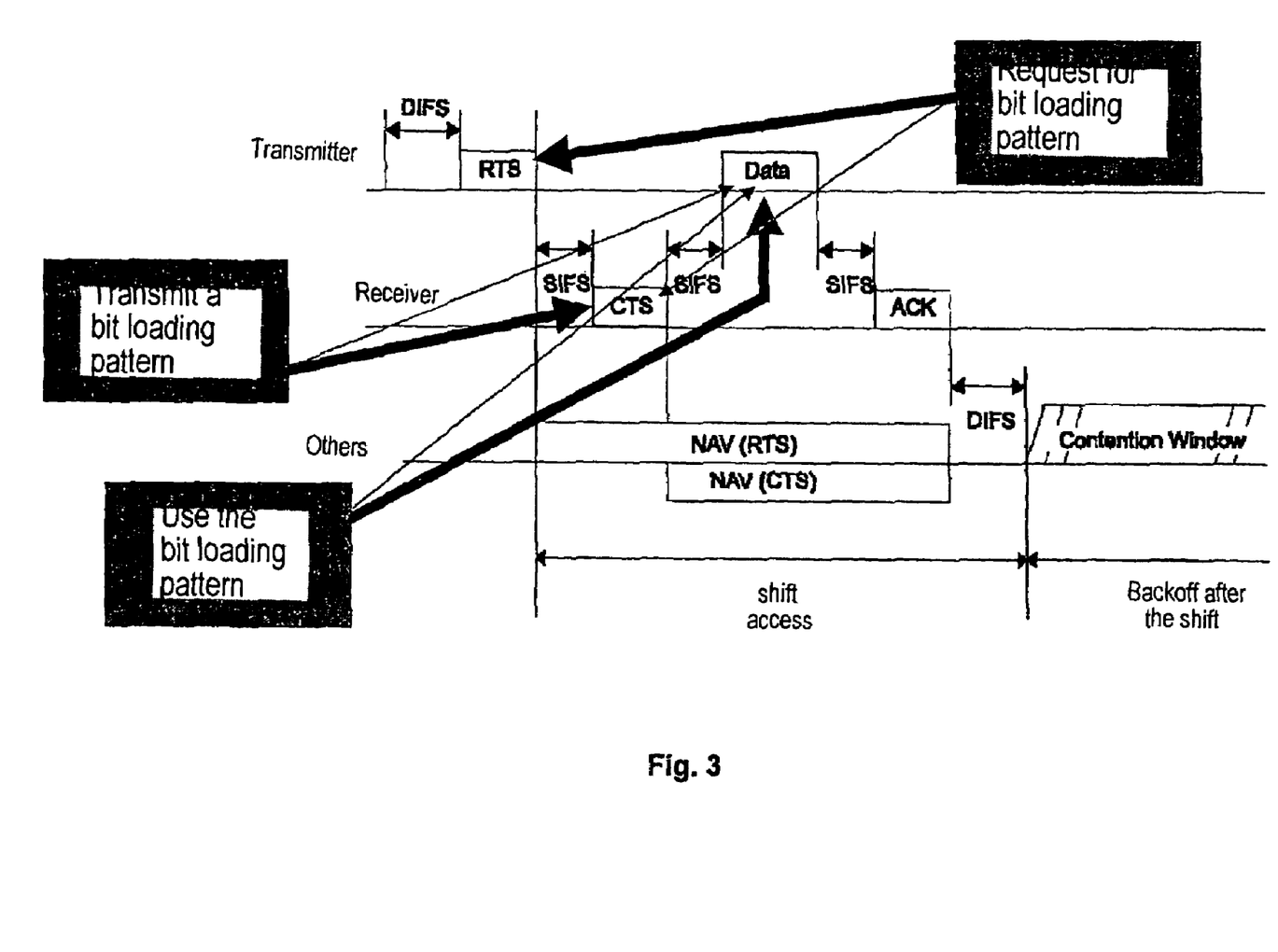
FIG. 3 shows a data exchange scheme in accordance with the present invention for bit loading tables in transmission systems with distributed access.

The fundamentals of the inventive signaling scheme shown in FIG. 3 correspond to those of the scheme shown in FIG. 1 and are thus based on Standard IEEE 802.11. However, as indicated by the thick arrows in FIG. 3, the content of the relevant data frame has been changed. To perform adaptive modulation an inquiry is made in the RTS signal of the transmitter about a bit loading table of the receiver. The receiver, in turn, integrates into its CTS message the bit loading table which it has calculated on the basis of pilots of the RTS signal. The bit loading table received by the transmitter in the CTS message is used by the transmitter to send the data in the data packet "Data."

A second signaling scheme is indicated by the thin arrows in FIG. 3. In this scheme, the receiver requests a bit loading table from the transmitter in a CTS message. The latter calculates a current bit loading table for the forwards channel on the basis of pilots from the CTS signal and integrates this bit loading table into the packet "Data" to be sent to the receiver. Simultaneously, the data to be transferred in the data packet "Data" is already being adaptively modulated in accordance with the bit loading table determined.

In time-division duplex mode, a particular terminal is either a transmitter or a receiver in each case. In both of the above cases (thick arrows and thin arrows in FIG. 3) the necessary transmitter and receiver functionality is implemented in both communicating terminals.

A comparison with FIG. 1 shows that the wait periods SIFS and DIFS are unchanged.

Figure 4:
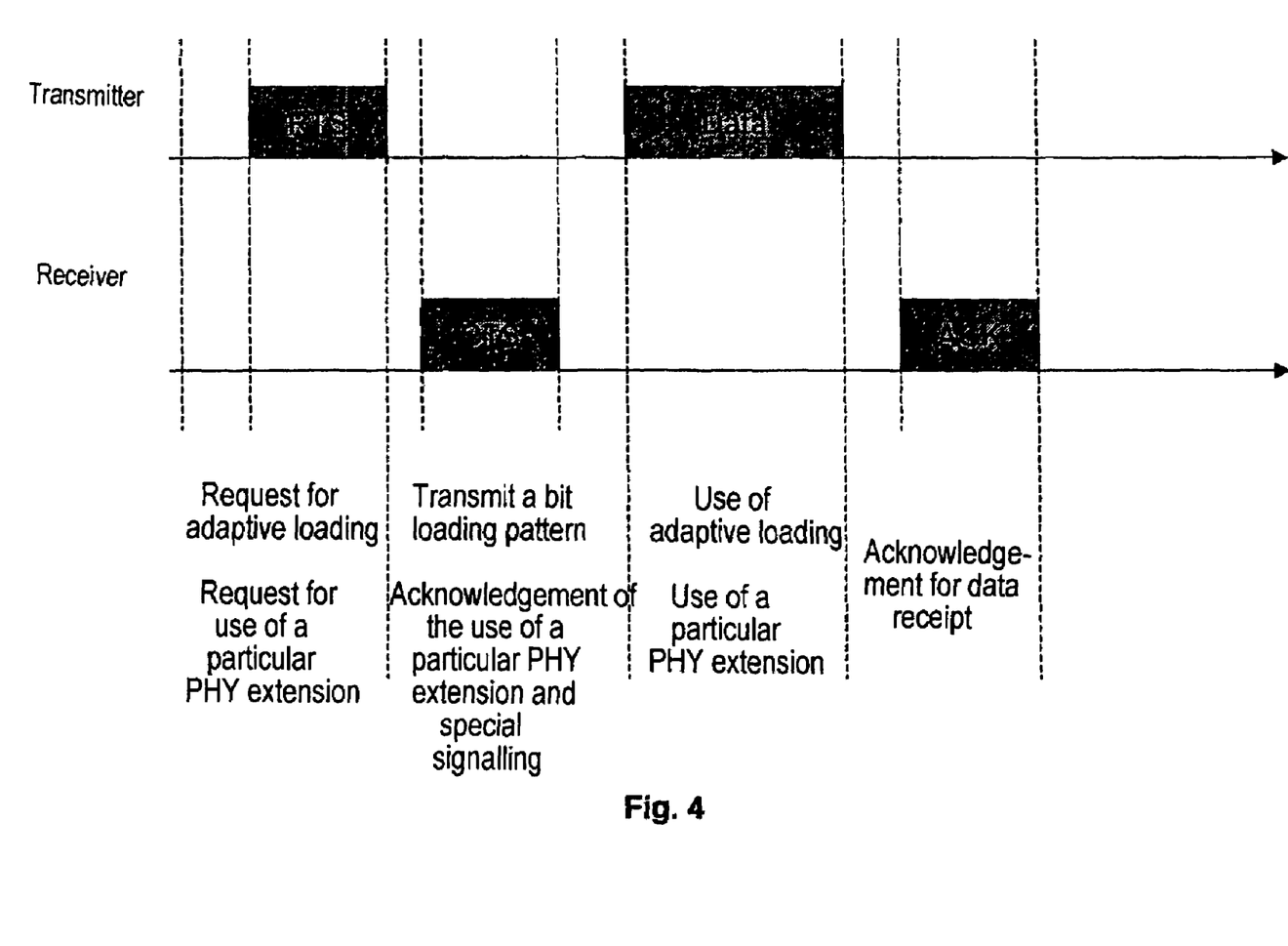
FIG. 4 shows an extract from the signaling scheme of FIG. 3.

In the signaling scheme of FIG. 4, the essential steps in accordance with the present invention for distributed access in a CSMA/CA system are summarized and expanded. Thus, the RTS data packet receives from the transmitter a request for adaptive modulation and, where necessary, an additional request for the use of specific expansion functions as regards the physical layer (PHY extensions). These types of PHY extensions allow transmission modes to be defined which extend beyond the "Physical Layer model" defined in the HIPERLAN/2 Standard. One example of this would be the well-known "Space Frequency Block Coding."

These types of expansions of the physical layer can be notified to the distant end in each case (i.e., the transmitter or receiver) and a specific expansion between the two terminals can be negotiated, which is then employed during data transmission. In this case, the assignment table can contain what is known as a "bit loading table" which is employed for adaptive modulation. "Negotiation" is essentially undertaken in three steps. In a first step, the first terminal notifies which expansions it supports. In the second step the second terminal notifies which expansions it supports. In the third step, the first terminal decides on one or more jointly supported expansions to be used for the subsequent transmission.

In accordance with FIG. 4, the CTS data packet of the receiver contains the bit loading table. In addition, it contains acknowledgement information about the use of a specific PHY extension.

The data packet "Data" of the transmitter contains the actual data to be transmitted. This is adaptively modulated according to the bit loading table received from the receiver. To transmit this data, a transmission mode with the specific PHY expansion is selected.

After a certain amount of wait time, the receiver transmits the acknowledgement data packet ACK which contains acknowledgement information about correct or incorrect receipt of the data packet "Data."

Figure 5:
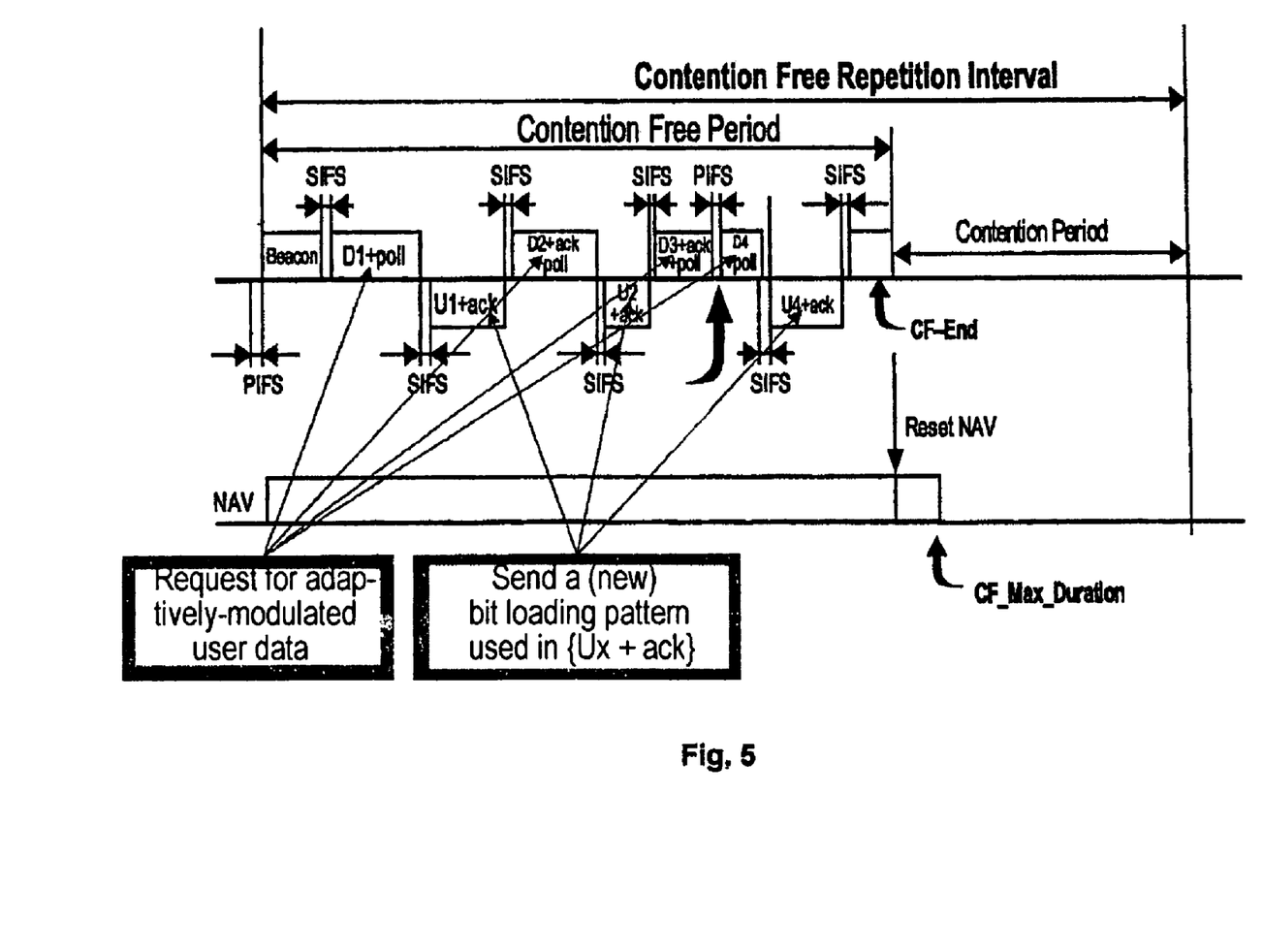
FIG. 5 shows an inventive signaling scheme for bit loading tables in a transmission system with central access.

FIG. 5 shows a PCF data transmission in accordance with the Standard IEEE 802.11, in which access to the data network is coordinated centrally. A transmission interval in this system is referred to as a "Contention-Free Repetition Interval." This interval consists of a contention-free period and a contention period in which contention for access to the data network by the individual users takes place. In the contention-free period access is regulated centrally whereas in the contention period access is coordinated on a distributed basis.

After a PCF Interframe Space transfer is started by a start signal (beacon) of the master which centrally coordinates access by a group of users to the data network. In this case, in the centrally coordinated operating mode, a data transmission from the master to the users is referred to as a downlink (DL) and a data transmission from the users to the master as an uplink (UL). After a short wait time SIFS, the master transmits to a user X as shown in FIG. 5 data in a connection D1, where the "D" of D1 identifies the downlink and the "1" the connection 1 to user X, with a polling request with which user X is requested to transmit data if he/she wishes to do so. Again after a short wait time SIFS, user X sends his/her data in uplink U1, where the "U" of "U1" identifies the Uplink and "1" the connection 1 of user X, with an acknowledgement message ack to the master. Again, after a short wait time SIFS, the master transmits to user Y data in the connection D2 with a polling message for user Y. At the same time, the master transmits with this message a confirmation ack for user X, that he/she has correctly received data in the connection U1. Subsequently, the master receives from user Y data in the connection U2 with an acknowledgement ack that the data in the connection D2 has arrived correctly at user Y.

Subsequently, the master accesses with data in the connection D3 a user Z who does not respond and thereafter a user Z with data in the connection D4 as well as a polling request, in which case the master does not need to transmit an acknowledgement ack to the user Z, since the latter has not responded. Thereafter, the user W transmits data in the connection U4 with an acknowledgement ack that he/she has correctly received the data in the connection D4 from the master. This typical data exchange in the contention-free period changes with the end signal CF-End of the master. This is followed by the contention period in which access to the data network is coordinated by each user himself/herself, preferably in the Distributed Coordination Function DCF operating mode.

The contention-free period is identified by an NAV (Network Allocation Vector). During this time, none of the stations or none of the users respectively begins a transmission on the medium. At the end of the contention-free period, the NAV is reset (Reset NAV). After a short delay after resetting, the contention-free time actually ends so that a maximum contention-free period CF_Max_Duration is produced.

This data transmission scheme is further used in accordance with the present invention, in which case the individual data blocks are supplemented with regard to adaptive modulation. The signaling of the bit loading tables necessary for adaptive modulation is shown by the thin arrows pointing to the relevant data blocks in FIG. 5. Thus, for each data transfer from the master to one of the users, a request for adaptively-modulated user data is made. In addition to the implicit or explicit query about whether the addressed station is capable of adaptive modulation, the inquiry contains the request for an actual bit loading table to be used. Each user accessed sends in their data packet, in connections U1, U2 or U4 the bit loading table that they have calculated and applies this to the data to be transferred in each case in the connection U1, U2 and U4.

In the diagram shown in FIG. 5, each of the users (User X, User Y, User Z and User W) has only been addressed or polled once by the master in each case in the contention-free period. Thus, the master transmits its data in connections D1, D2, D3 and D4 with fixed modulation to the relevant user. If, however, a user is addressed a number of times in a contention-free period by the master and has sent the master a current bit loading table, as from the second transmission to the same user the master uses the current bit loading table for adaptive modulation instead of fixed modulation.

Figure 6:
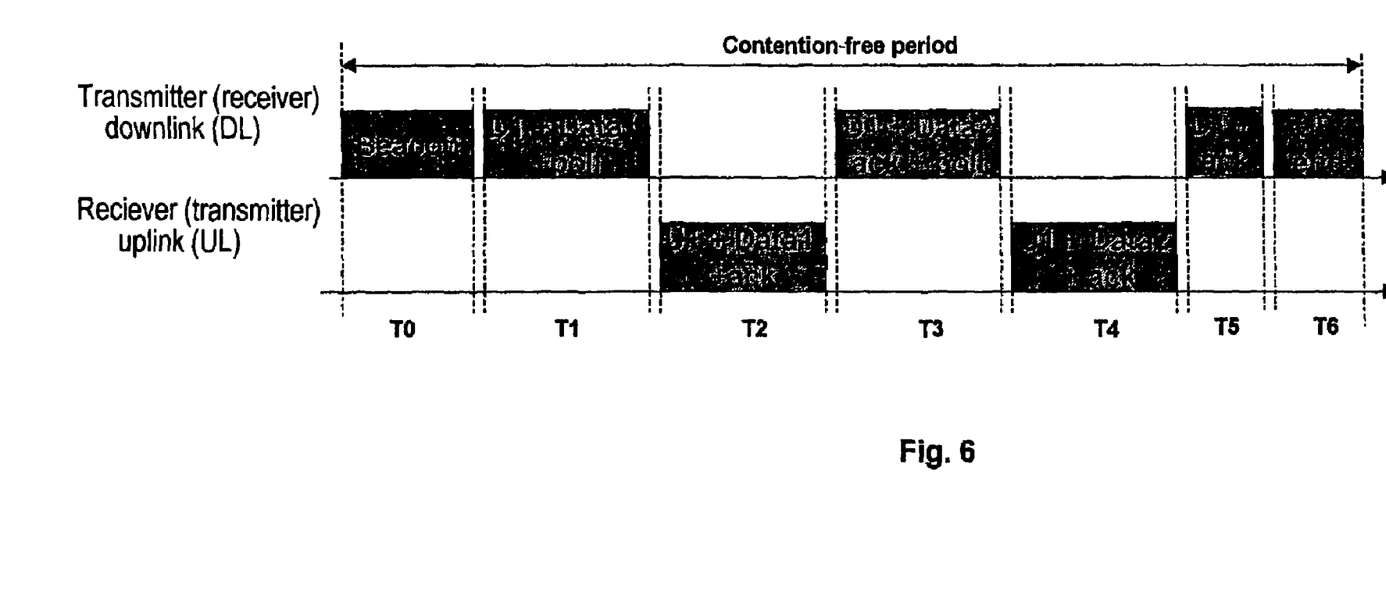
FIG. 6 shows a variant of the signaling scheme of FIG. 5.

This type of CSMA scheme with adaptive modulation is shown in FIG. 6. In a time interval T0, the transmitter or the master issues the start signal (beacon) for the contention-free period. This period ends with the signal CF-End in time interval T6. In time interval T1, the master (transmitter) transfers in the connection D1 data Data 1 to a specific user (receiver) which it addresses with the polling message poll. At the same time, the master (transmitter) requests the bit loading table. In the time interval T2, the bit loading table is transferred from the user (receiver) to the master (transmitter) and fixed modulation continues to be used for transmission of the data Data 1 from the user (receiver) to the master (transmitter). In this case, there is generally a distinction between the data Data 1 of the master in the connection D1 and the data Data 1 of the subscriber in the connection U1. With the acknowledgement information ack, the user (receiver) confirms receipt of the data Data 1 from the master (transmitter). In addition, the user (receiver) requests the bit loading table from the master (transmitter). In the time interval T3, the master (transmitter) transfers further data Data 2 using the bit loading table received in the time interval T2. Further, he/she transfers the requested bit loading table to the user (receiver). In the time interval T4, the user (receiver) transfers his/her data Data 2 to the master (transmitter) using the bit loading table received in the time interval T3.

With this signaling scheme, an updated bit loading table can be transmitted either only on request or with each data transmission.

Figure 7:
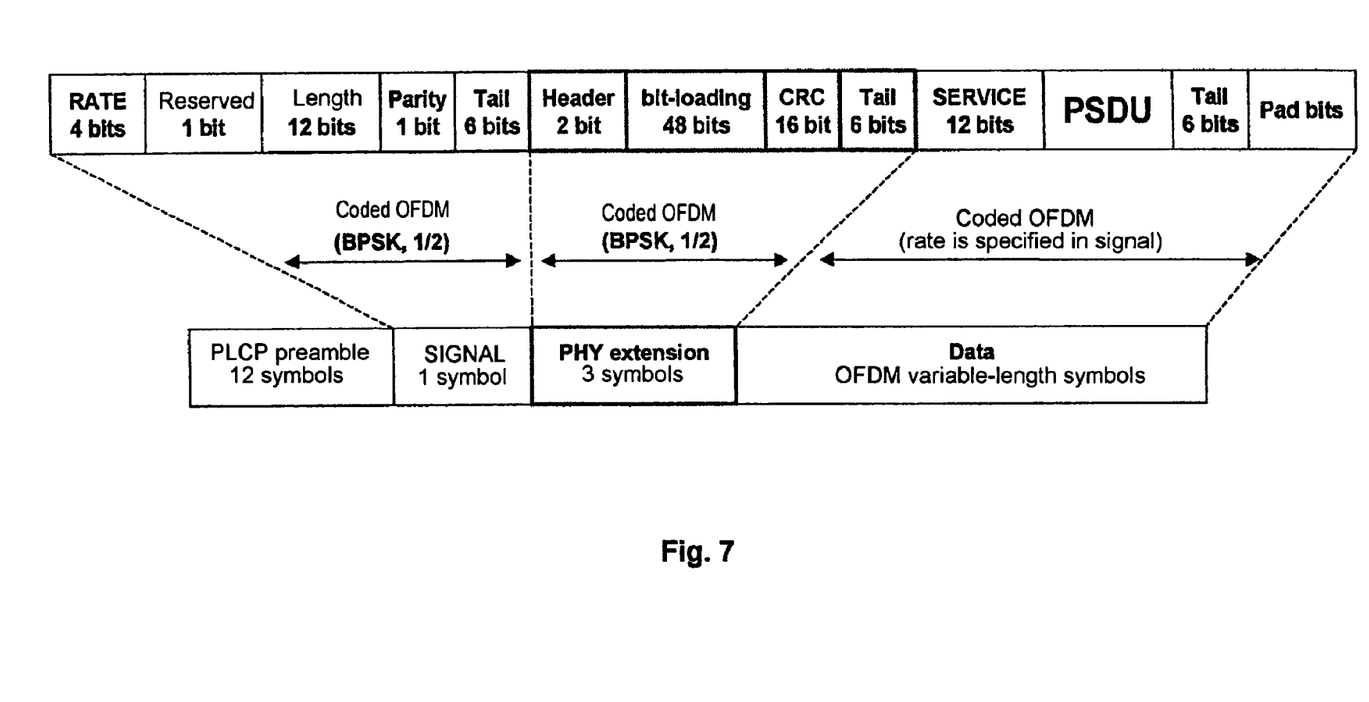
FIG. 7 shows a data packet frame containing a bit loading table.

FIG. 7 shows the structure of a PLCP data frame as can be used within an OFDM system specified in accordance with IEEE 802.11a. This data frame is referred to as a PPDU (PLCP Protocol Data Unit) which is based on the PLCP (Physical Layer Convergence Protocol). The PPDU possesses a PLCP preamble with twelve symbols. Following this is a one-symbol data part SIGNAL consisting of a data rate RATE, a reserved bit, a length specification, a parity bit and what is known as a tail.

In accordance with the present invention, the subsequent three OFDM symbols, each consisting of 24 bits, are used for adaptive modulation or for the expansion of the physical layer (PHY extension). The three symbols are made up of a header with two bits, the bit loading information with 48 bits, a cyclic redundancy code CRC with 16 bits and a tail with 16 bits.

Following on from the three symbols for adaptive modulation is the actual data to be transmitted Data which is of variable length with a differing number of OFDM symbols. The data part possesses the known structures with twelve service bits, the PLCP Service Data Unit PSDU, the tail with six bits and a number of pad bits.

The components of the PPDU, referred to as "signal," "PHY extension" and "data" are transmitted with coded OFDM, in the present case BPSK, ½. The rate for the data part is transmitted in the signal part.

This allows adaptive modulation of a PPDU to be implemented by inserting and using only three OFDM symbols which have a time requirement of 12 μs in a CTS message in accordance with the IEEE 802.11a Specification. In this case, the reserved bit or the RATE field can point to the field for adaptive modulation (PHY extension field).

Figure 8:
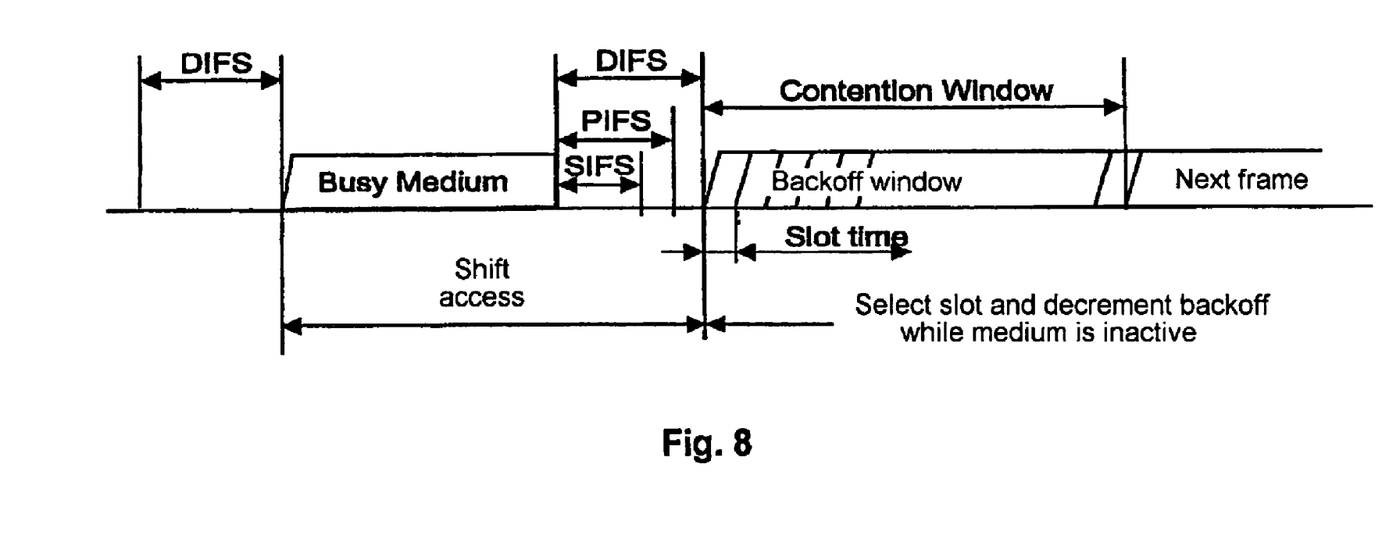
FIG. 8 shows the timing relationship of time intervals, the so-called Interframe Spaces (IFS), between the data blocks and the backoff procedure for central and distributed access procedures.

Finally, FIG. 8 shows that the backoff procedure to avoid collisions, as already indicated in FIG. 1, remains unchanged. In particular, all DIFS, PIEFS and SIFS time intervals also remain unchanged for adaptive modulation. Thus, after the shifting of access during the contention-free period in the contention window a corresponding slot is selected and the backoff is incremented while the medium is inactive.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method for transmitting data signals in a communication system with access organized on a distributed basis to an access medium using a plurality of transmission modes by transmitting at least one pilot signal from a transmitter to a receiver, wherein the at least one pilot signal comprises a request for a physical layer expansion, the method comprising:

calculating, by the receiver, an assignment table in respect of the transmission modes using the at least one pilot signal;

transmitting the assignment table from the receiver to the transmitter, wherein the assignment table comprises acknowledgment data for the physical layer expansion; and transmitting the data signals using the transmission modes in accordance with the assignment table in a direction which is one of from the transmitter to the receiver and from the receiver to the transmitter.

2. A method for transmitting data signals in a communication system as claimed in claim 1, wherein basic transmission is specified in accordance with IEEE 802.11.

3. A method for transmitting data signals in a communication system as claimed in claim 2, wherein at least one pilot signal is transmitted in an RTS message.

4. A method for transmitting data signals in a communication system as claimed in claim 2, wherein the assignment table includes at least one of a bit loading table for adaptive modulation and expansion data for expansions of a physical layer which extend beyond Standard IEEE 802.11 a.

5. A method for transmitting data signals in a communication system as claimed in claim 4, wherein a request from the transmitter for at least one of adaptive modulation and expansions of the physical layer which extend beyond Standard IEEE 802.11 a is made in an RTS message.

6. A method for transmitting data signals in a communication system as claimed in claim 4, wherein at least one of a request and an acknowledgement from the receiver in respect of at least one of adaptive modulation and expansions of the physical layer which extend beyond Standard IEEE 802.11 a are transmitted in a CTS message.

7. A method for transmitting data signals in a communication system as claimed in claim 4, wherein use of a specific expansion of the physical layer which extends beyond Standard IEEE 802.11 a is confirmed in a CTS message.

8. A method for transmitting data signals in a communication system as claimed in claim 1, wherein the assignment table is transmitted by the receiver in a CTS message.

9. A method for transmitting data signals in a communication system as claimed in claim 1, wherein a communication terminal includes both transmitter and receiver functionality and the assignment table is transmitted in a direction which is one of from the transmitter to the receiver and from the receiver to the transmitter.

10. A method for transmitting data signals in a communication system as claimed in claim 9, wherein the assignment table is employed in the transmitted data signals.

11. A method for transmitting data signals in a communication system as claimed in claim 1, wherein for transmission of the assignment table at least one data symbol is used which consists of 24 bits.

12. A method for transmitting data signals in a communication system as claimed in claim 1, wherein the communication system is a CSMA system according to Standard IEEE 802.11.

13. A method for transmitting data signals in a communication system as claimed in claim 1, wherein the transmission modes are at least partly a result of an adaptive modulation.

14. A method for transmitting data signals in a communication system with centrally organized access to a transmission medium using a plurality of transmission modes by transmitting at least one pilot signal from a transmitter to a receiver, wherein the at least one pilot signal comprises a request for a physical layer expansion, the method comprising:

calculating, by the receiver, an assignment table in respect of the transmission modes using the at least one pilot signal;

transmitting the assignment table from the receiver to the transmitter, wherein the assignment table comprises acknowledgment data for the physical layer expansion; and transmitting, in accordance with the assignment table, the data signals using the transmission modes transferred in the assignment table from the receiver to the transmitter.

15. A method for transmitting data signals in a communication system as claimed in claim 14, wherein the data to be transmitted is modulated with a fixed modulation scheme provided there is no assignment table present in respect of the transmission modes.

16. A method for transmitting data signals in a communication system as claimed in claim 14, wherein the assignment table includes at least one of a bit loading table for adaptive modulation and expansion data for expansions of a physical layer which extend beyond Standard IEEE 802.11 a.

17. A method for transmitting data signals in a communication system as claimed in claim 14, wherein the communication system is a CSMA system according to Standard IEEE 802.11.

18. A method for transmitting data signals in a communication system as claimed in claim 14, wherein the transmission modes are at least partly a result of an adaptive modulation.

* * * * *